United States Patent [19]

Kitsugi et al.

[11] Patent Number: 4,457,901

[45] Date of Patent: Jul. 3, 1984

[54] METHOD OF REFINING SILICON TETRAFLUORIDE GAS

[75] Inventors: Naomichi Kitsugi,m Tokorozawa; Teruo Fujinaga, Kawagoe; Toyozo Otsuka, Kamifukuoka, all of Japan

[73] Assignee: Central Glass Company, Limited, Ube, Japan

[21] Appl. No.: 405,384

[22] Filed: Aug. 5, 1982

[30] Foreign Application Priority Data

Aug. 6, 1981 [JP] Japan .................... 56-122457

[51] Int. Cl.$^3$ ............... C01B 33/08; B01D 53/34
[52] U.S. Cl. ............................ 423/341; 423/240; 423/342
[58] Field of Search ............... 423/240, 325, 341, 342

[56] References Cited

U.S. PATENT DOCUMENTS

| | | | |
|---|---|---|---|
| 2,844,441 | 7/1958 | Pellin | 423/341 |
| 2,999,736 | 9/1961 | Shalit | 423/341 |
| 4,382,071 | 5/1983 | Otsuka et al. | 423/341 |

FOREIGN PATENT DOCUMENTS 779804  7/1957  United Kingdom ............... 423/341

*Primary Examiner*—Earl C. Thomas
*Attorney, Agent, or Firm*—Fleit, Jacobson, Cohn & Price

[57] ABSTRACT

$SiF_4$ gas containing oxygen-containing silicofluoride(s) typified by $(SiF_3)_2O$ as impurity can be refined to extremely high purity by making the $SiF_4$ gas contact with HF in the presence of a liquid medium having strong affinity for water such as sulfuric acid or phosphoric acid. By reaction with HF, the impurity such as $(SiF_3)_2O$ is converted to $SiF_4$, while the liquid medium absorbs water formed by the reaction to thereby prevent a reverse reaction between $SiF_4$ and $H_2O$ to form $(SiF_3)_2O$.

10 Claims, No Drawings

METHOD OF REFINING SILICON TETRAFLUORIDE GAS

BACKGROUND OF THE INVENTION

This invention relates to a method of refining silicon tetrafluoride gas which contains oxygen-containing silicofluoride(s) such as fluorosiloxane and/or fluorosilanol as impurity matter.

High purity silicon tetrafluoride gas is useful for the preparation of amorphous silicon semiconductor which is expected as an advantageous material for various electronic devices including photovoltaic cell elements.

As is well known, silicon tetrafluoride gas readily reacts with water in liquid state to form hexafluorosilicic acid and gel-like silica as represented by the following equation (1). Furthermore, silicon tetrafluoride gas reacts with moisture in the atmosphere and even with a trace amount of water adsorbed on a metal or glass surface, or with the combined water in a clay-like mineral material such as zeolite or kaolin, to form hexafluorodisiloxane as represented by the following equation (2).

$$3SiF_4 + 2H_2O \rightarrow 2H_2SiF_6 + SiO_2 \quad (1)$$
$$2SiF_4 + H_2O \rightarrow (SiF_3)_2O + 2HF \quad (2)$$

Therefore, it is almost inevitable that silicon tetrafluoride gas prepared by reaction between silica sand, silica gel or a silicate with hydrogen fluoride or hydrofluoric acid contains a certain amount of hexafluorodisiloxane as impurity matter. Besides, the result of mass spectrometry of silicon tetrafluoride gas often indicates the presence of trifluorosilanol $SiF_3OH$ too.

In the production of amorphous silicon by using silicon tetrafluoride gas by a glow discharge method for example, the presence of any oxygen-containing silicofluoride having either Si-SO bond or Si-O-Si bond in the silicon tetrafluoride gas is liable to result in the intrusion of Si-O-Si bond into the intended Si-Si network structure with detrimental influences on the properties of the obtained amorphous silicon as a semiconductor material.

SUMMARY OF THE INVENTION

It is an object of the present invention to provide an efficient and fully practicable method of refining silicon tetrafluoride gas containing at least one oxygencontaining silicofluoride as impurity, by which method the oxygen-containing silicofluoride(s) can almost completely be converted to slicon tetrafluoride.

Essentially a refining method according to the invention comprises the step of making a silicon tetrafluoride gas containing at least one oxygen-containing silicofluoride as impurity contact with hydrogen fluoride in the presence of a liquid medium which has strong affinity for water thereby forcing the oxygen-containing silicofluoride to react with hydrogen fluoride.

The fundamental concept of the present invention is to convert the oxygen-containing impurity in the silicon tetrafluoride gas to silicon tetrafluoride by forcing the impurity to react with hydrogen fluoride and, at the same time, suppressing the reaction between silicon tetrafluoride and water. The reaction intended in this refining method is represented by the following equation (3) where the oxygen-containing silicofluoride is hexafluorodisiloxane.

$$(SiF_3)_2O + 2HF \rightleftharpoons 2SiF_4 + H_2O \quad (3)$$

The reaction of Equation (3) is reversible, and the reverse reaction corresponds to the undesirable reaction of Equation (2). In order that the reaction of Equation (3) proceeds exclusively to the right, it is necessary to remove water formed by the reaction from the reaction system or to isolate the water from $SiF_4$ gas. In the refining method according to the invention, the liquid medium having strong affinity for water serves the purpose of efficiently absorbing water formed by the intended reaction. In the reaction system, therefore, the partial pressure of water in vapor phase remains at an extremely low level so that the undesirable reverse reaction hardly takes place. Owing to such effects of the strongly hydrophilic liquid medium in the refining method according to the invention, it has become possible to achieve refining of $SiF_4$ gas to such an extent that $(SiF_3)_2O$ or any other oxygen containing silicofluoride cannot be detected by infrared absorption spectrum analysis of the refined gas.

DESCRIPTION OF THE PREFERRED EMBODIMENTS

There are a variety of liquid materials which have strong affinity for water and are useful as liquid medium in the method according to the invention. Preferred examples of suitable liquid materials are inorganic acids and some organic solvents such as glycerin and ethylene glycol. However, usually and particularly when it is required to obtain $SiF_4$ gas refined to utmost extent, it is more preferable to use an inorganic acid relatively low in volatility, such as sulfuric acid or phosphoric acid, than to use an organic solvent such as glycerin. Since the refining treatment according to the invention is usually carried out at a relatively low temperature, for example at ambient temperature, with the intention of rendering the partial pressure of water in vapor phase in the reaction system as low as possible, the use of an organic solvent as the liquid medium might result in insufficient contact between the $SiF_4$ gas to be purified and HF due to relatively high viscosity of the liquid medium. Both sulfuric acid and phosphoric acid are very strong in the affinity for water and low in volatility and, besides, are easy to industrially handle and available at low prices. For efficient absorption of water, it is suitable to use either sulfuric acid or phosphoric acid of sufficiently high concentration. In the case of sulfuric acid, for example, it is preferable that the concentration of $H_2SO_4$ in the acid is at least 70% by weight firstly because the refining can be achieved highly effectively by doing so and secondly because the solubility of $SiF_4$ gas in such a concentrated sulfuric acid is sufficiently low.

In the refining method of the invention, the contact between the $SiF_4$ gas and HF in the presence of the liquid medium can be accomplished in various manners. For example, HF may be dissolved in the liquid medium in advance to perform the refining treatment by simply passing the $SiF_4$ gas through the liquid medium. Alternatively, the $SiF_4$ gas and HF gas may simultaneously be introduced into a plain liquid medium. It is also possible to perform counter-current contact between the $SiF_4$ gas and a liquid medium containing HF therein.

The quantity of HF required for achievement of the refining is variable depending on the content of the oxygen-containing silicofluoride in the $SiF_4$ gas to be refined. It suffices that the quantity of HF is slightly larger than a theoretical quantity according to Equation (3). The use of excessively large amount of HF is unfavorable because it will result in a considerable increase in the partial pressure of HF in the purifying apparatus and, hence, in the outflow of a considerable quantity of HF from the apparatus together with the refined $SiF_4$ gas, which places high load on the subsequent step of separating HF from the $SiF_4$ gas. When use is made of a liquid medium prepared by dissolving HF in sulfuric acid or phosphoric acid, usually it is suitable that the content of HF in the liquid medium is from about 0.1% to about 1.5% by weight. However, the content of HF in the liquid medium should adequately be increased if it is intended to purify a $SiF_4$ gas unusually high in the content of oxygen-containing silicofluoride(s). In the case of performing the refining operation by continuously passing $SiF_4$ gas through a liquid medium containing HF dissolved therein for long hours, there will arise the need of supplementing HF to the liquid medium at suitable intervals.

The reaction intended in the refining method of the invention smoothly proceeds at ambient temperature, but if desired it is permissible to somewhat heat or cool the reaction system or the liquid medium. In general relatively low temperatures are favorable for maintaining both the partial pressure of HF and the partial pressure of $H_2O$ in vapor phase at low levels, but relatively high temperatures are somewhat favorable for promoting the intended reaction. Considering the total effect and efficiency of the refining operation, it is suitable to employ a reaction temperature in the range from about 0° C. to ambient temperature.

The following examples further illustrate the present invention.

EXAMPLE 1

An experimentally prepared $SiF_4$ gas containing a certain amount of $(SiF_3)_2O$ was sampled and subjected to infrared spectrophotometry in a 100 mm long gas cell. (Gas cells of the same size were used throughout the examples.) In the infrared absorption spectrum of this gas, the logarithmic ratio of the absorption peak at 839 $cm^{-1}$ attributed to the stretching vibration of $SiF_3$ of $(SiF_3)_2O$ to the absorption peak at 2057 $cm^{-1}$ attributed to the stretching vibration of Si-F of $SiF_4$ was 0.121.

Several batchs of sulfuric acid different in $H_2SO_4$ concentration were each forced to absorb a determined amount of anhydrous hydrogen fluoride to obtain several batchs of mixed acid of the compositions as shown in the following Table 1.

Three gas washing-bottles made of teflon employed as reaction vessels were connected in series with one another to constitute a purifying apparatus, and 130 g of mixed acid selected from the aforementioned batchs was put into every reaction vessel of the apparatus. In the first experiment the mixed acid in the apparatus was left at room temperature, and the aforementioned $SiF_4$ gas was continuously passed through the apparatus at a constant flow rate of 4 l/hr so as to make sufficient contact with the mixed acid. After the lapse of 1 hr, the gas under the purifying treatment was sampled at the outlet of the third-stage reaction vessel and subjected to infrared spectrophotometry. In this experiment four runs of the described process were carried out by using four different batchs of mixed acid. The results of this experiment are presented in Table 1.

In the second experiment, four runs of a generally similar process were carried out but by maintaining the mixed acid in the apparatus cooled at 0° C. in every run. Table 1 contains the results of the second experiment too.

TABLE 1

| Composition of Mixed Acid (Wt %) | | | Temperature (°C.) | Infrared Absorption Peak Ratio $(SiF_3)_2O/SiF_4$ | |
|---|---|---|---|---|---|
| $H_2SO_4$ | HF | $H_2O$ | | before treatment | after treatment |
| 96.0 | 1.3 | 2.7 | 20 | 0.121 | 0.000 |
| 86.5 | 1.3 | 12.2 | 22 | " | 0.000 |
| 77.2 | 1.3 | 21.5 | 18 | " | 0.000 |
| 70.1 | 1.3 | 28.6 | 20 | " | 0.001 |
| 96.0 | 1.3 | 2.7 | 0 | " | 0.000 |
| 91.6 | 1.3 | 7.1 | 0 | " | 0.000 |
| 81.6 | 1.3 | 17.1 | 0 | " | 0.000 |
| 70.1 | 1.3 | 28.6 | 0 | " | 0.003 |

The experimental results in Table 1 indicate that very efficient conversion of $(SiF_3)_2O$ to $SiF_4$ can be achieved when the concentration of $H_2SO_4$ in the liquid medium is above about 70% by weight, and that an extremely good result can be obtained by making the liquid medium contain more than about 80% by weight of $H_2SO_4$. Also it is understood that almost similarly good results can be obtained whether the reaction is carried out at ambient temperature or at somewhat lower temperatures. As the third experiment to examine the effect of a variation in the content of HF in mixed acid used as the liquid medium, additional four runs were carried out generally in accordance with the above described second experiment but by using different mixed acids prepared by dissolving a variable amount of HF in sulfuric acid of a determined concentration. Table 2 shows the compositions of the mixed acids used in this experiment and the results of the experiment.

Table 2

TABLE 2

| Composition of Mixed Acid (Wt %) | | | Temperature (°C.) | Infrared Absorption Peak Ratio $(SiF_3)_2O/SiF_4$ | |
|---|---|---|---|---|---|
| $H_2SO_4$ | HF | $H_2O$ | | before treatment | after treatment |
| 96.0 | 1.3 | 2.7 | 0 | 0.121 | 0.000 |
| 96.0 | 0.75 | 3.2 | 0 | " | 0.001 |
| 96.0 | 0.48 | 3.5 | 0 | " | 0.016 |
| 96.0 | 0.16 | 3.8 | 0 | " | 0.077 |

As demonstrated by the results of this experiment, usually it suffices for achieving very efficient conversion of $(SiF_3)_2O$ to $SiF_4$ that a sulfuric acid base mixed acid as the liquid medium contains about 0.15 to about 1.0% by weight of HF.

EXAMPLE 2

A $SiF_4$ gas subjected to purification in this example was higher in the content of $(SiF_3)_2O$ than the $SiF_4$ gas used in Example 1. By infrared spectrophotometry, the logarithmic ratio of the absorption peak at 839 $cm^{-1}$ characteristic of $(SiF_3)_2O$ to the absorption peak at 2057 $cm^{-1}$ characteristic of $SiF_4$ was 0.236.

A mixed acid was prepared by forcing concentrated sulfuric acid to absorb anhydrous hydrogen fluoride such that the resultant mixed acid was composed of 96% of $H_2SO_4$, 0.48% of HF and 3.52% of water by weight.

Use was made of the apparatus described in Example 1, and 130 g of the mixed acid was put into each of the three washing-bottles employed as reaction vessels. The mixed acid in the apparatus was kept cooled at 10° C., and the SiF₄ gas was continuously passed through the apparatus at a constant flow rate of 4 l/hr so as to make sufficient contact with the mixed acid. After the lapse of 1 hr, the gas under the treatment was sampled at the outlet of each reaction vessel and subjected to infrared spectrophotometry.

In the infrared absorption spectrum of the gas sample taken at the outlet of the first-stage reaction vessel the logarithmic ratio of the absorption peak at 839 cm$^{-1}$ to the absorption peak at 2057 cm$^{-1}$ was 0.086, but the absorption peak ratio value lowered to 0.031 in the absorption spectrum of the gas sample taken at the outlet of the second-stage reaction vessel and to 0.006 in the absorption spectrum of the gas sample taken at the outlet of the third-stage reaction vessel.

EXAMPLE 3

The purifying process of Example 2 was repeated generally similarly, except that the mixed acid in the apparatus was left at room temperature (20° C.).

After the lapse of 1 hr from the start of the continuous treatment, the SiF₄ gas under the treatment was sampled and subjected to infrared absorption spectrum analysis. In the infrared absorption spectrum of the gas sample taken at the outlet of the first-stage reaction vessel the logarithmic ratio of the absorption peak at 839 cm$^{-1}$ to the absorption peak at 2057 cm$^{-1}$ was 0.059. However, no absorption peak was observed at 839 cm$^{-1}$ in the absorption spectrums of the remaining gas samples respectively taken at the outlets of the second-stage and third-stage reaction vessels, so that the absorption peak ratio became 0.000 for these samples.

From a comparison between Example 2 and Example 3, it is understood that the efficiency of the purifying treatment becomes higher when the treatment temperature is at or about room temperature than in the cases of employing lower treatment temperatures.

EXAMPLE 4

A SiF₄ gas as the object of purification in this example was still higher in the content of (SiF₃)₂O than the SiF₄ gas treated in Examples 2 and 3. By infrared absorption spectrum analysis, the logarithmic ratio of the absorption peak at 839 cm$^{-1}$ to the absorption peak at 2057 cm$^{-1}$ was 0.628.

A mixed acid was prepared by forcing concentrated sulfuric acid to absorb a relatively large amount of anhydrous hydrogen fluoride such that the resultant mixed acid was composed of 96% of H₂SO₄, 2.4% of HF and 1.6% of H₂O by weight.

The SiF₄ gas was treated with this mixed acid by the same method and under the same conditions as in Example 3.

In the infrared absorption spectrum of the gas sample taken at the outlet of the first-stage reaction vessel the logarithmic ratio of the absorption peak at 839 cm$^{-1}$ to the absorption peak at 2057 cm$^{-1}$ was 0.075, and in the absorption spectrum of the gas sample taken at the outlet of the second-stage reaction vessel the absorption peak ratio was 0.006. However, no absorption peak was observed at 839 cm$^{-1}$ in the absorption spectrum of the gas sample taken at the outlet of the thirdstage reaction vessel.

EXAMPLE 5

By infrared absorption spectrum analysis of a SiF₄ gas containing (SiF₃)₂O as the object of purification in this example, it was found that the logarithmic ratio of the absorption peak at 839 cm$^{-1}$ to the absorption peak at 2057 cm$^{-1}$ was 0.357.

Employed as liquid medium was phosphoric acid in which the content of P₂O₅ was 69.5%. The phosphoric acid was put into two reaction vessels that were connected to each other to constitute a two-stage purifying apparatus, and the phosphoric acid in the apparatus was left at room temperature. The SiF₄ gas was continuously introduced into the purifying apparatus at a constant flow rate of 4 l/hr, and simultaneously HF gas was introduced into the same apparatus at a constant flow rate of 50 ml/hr. The apparatus was arranged such that the introduced gases well dispersed in the phosphoric acid to form small bubbles.

By infrared absorption spectrum analysis of the gas sampled at the outlet of the second-stage reaction vessel, it was observed that the absorption peak at 1 839 cm$^{-1}$ was almost negligible, so that the purifying treatment was judged to have achieved practically complete conversion of (SiF₃)₂O contained in the starting gas to SiF₄.

EXAMPLE 6

In the infrared absorption spectrum of a SiF₄ gas as the object of purification in this example, the logarithmic ratio of the absorption peak at 839 cm$^{-1}$ to the absorption peak at 2057 cm$^{-1}$ was 0.133.

Phosphoric acid containing 69.5% of P₂O₅ was forced to absorb anhydrous hydrogen fluoride to obtain two kinds of mixed acids one of which contained 1.3% by weight of HF and the other 0.8% of HF. Additionally prepared by using phosphoric acid containing 59.3% of P₂O₅ and anhydrous hydrogen fluoride were two kinds of mixed acids one of which contained 1.3% by weight of HF and the other 0.8% of HF.

By alternately using these four kinds of mixed acids, the SiF₄ gas was treated at a constant rate of 4 l/hr by using the method and apparatus described in Examples 1 and 2. For each mixed acid two runs of the purifying treatment were carried out by keeping the mixed acid in the apparatus at 0° C. in one run and at 18° C. (room temperature) in the other run. After the lapse of 1 hr from the start of each run, the gas was sampled at the outlet of the third-stage reaction vessel and subjected to infrared absorption spectrum analysis.

Table 3 shows the purifying conditions in this example and the results of the infrared absorption spectrum analysis.

TABLE 3

| Composition of Mixed Acid (Wt %) | | | Temperature (°C.) | Infrared Absorption Peak Ratio (SiF₃)₂O/SiF₄ | |
|---|---|---|---|---|---|
| H₃PO₄ (P₂O₅) | HF | H₂O | | before treatment | after treatment |
| 95.9 (69.5) | 1.3 | 2.8 | 0 | 0.133 | 0.000 |
|  |  |  | 18 | " | 0.000 |
| 95.9 (69.5) | 0.8 | 3.3 | 0 | " | 0.003 |
|  |  |  | 18 | " | 0.000 |
| 81.9 (59.3) | 1.3 | 16.8 | 0 | " | 0.005 |
|  |  |  | 18 | " | 0.001 |
| 81.9 (59.3) | 0.8 | 17.5 | 0 | " | 0.011 |
|  |  |  | 18 | " | 0.006 |

EXAMPLE 7

A fluorine-containing liquid medium was prepared by mixing 100 parts by weight of glycerin with 1.5 parts by weight of anhydrous hydrogen fluoride.

Use was made of the purifying apparatus described in Example 1, and 170 g of the fluorine-containing liquid medium was put into each reaction vessel of the apparatus. To lower the viscosity of the liquid medium in the reaction vessels, the purifying apparatus was placed in a constant-temperature tank in which the temperature was kept at 50°C. In this state, the $SiF_4$ gas mentioned in Example 6 was continuously passed through the purifying apparatus at a constant flow rate of 4 l/hr.

After the lapse of 1 hr from the start of the purifying treatment, the gas was sampled at the outlet of the third-stage reaction vessel and subjected to infrared absorption spectrum analysis. As the result the logarithmic ratio of the absorption peak at 839 $cm^{-1}$ to the absorption peak at 2057 $cm^{-1}$ was 0.077, and accordingly this purifying treatment was confirmed to be effective.

What is claimed is:

1. A method of refining a silicon tetrafluoride gas containing hexafluorodisiloxane as impurity, the method comprising the step of making the silicon tetrafluoride gas contact with hydrogen fluoride in the presence of a liquid medium which has strong affinity for water thereby forcing said hexafluorodisiloxane to react with hydrogen fluoride.

2. A method according to claim 1, wherein said liquid medium is an inorganic acid.

3. A method according to claim 2, wherein said inorganic acid is selected from the group consisting of sulfuric acid and phosphoric acid.

4. A method according to claim 2, wherein said inorganic acid is sulfuric acid containing at least 70% by weight of $H_2SO_4$.

5. A method according to claim 1, wherein said liquid medium is an organic solvent.

6. A method according to claim 5, wherein said organic solvent is selected from the group consisting of glycerin and ethylene glycol.

7. A method according to claim 1, wherein the contact between the silicon tetrafluoride gas and hydrogen fluoride is accomplished by the sub-steps of dissolving hydrogen fluoride in said liquid medium in advance and then introducing the silicon tetrafluoride gas into the liquid medium.

8. A method according to claim 1, wherein the contact between the silicon tetrafluoride gas and hydrogen fluoride is accomplished by simultaneously introducing the silicon tetrafluoride gas and hydrogen fluoride gas into said liquid medium.

9. A method according to claim 1, wherein the contact between the silicon tetrafluoride gas and hydrogen fluoride is accomplished by the sub-steps of dissolving hydrogen fluoride in said liquid medium in advance and then causing counter-current contact between the silicon tetrafluoride gas and the liquid medium.

10. A method according to claim 1, wherein the contact between the silicon tetrafluoride gas and hydrogen fluoride is accomplished at a temperature between about 0° C. and ambient temperature.

* * * * *